United States Patent
Alaas et al.

(10) Patent No.: US 10,815,768 B2
(45) Date of Patent: Oct. 27, 2020

(54) METHOD OF DETECTING PRESENCE OF RFID TAGS AND DETERMINING PROPERTIES OF SURROUNDING ENVIRONMENT IN SUBTERRANEAN FORMATION

(71) Applicant: Halliburton Energy Services, Inc., Houston, TX (US)

(72) Inventors: Yusef H. Alaas, Houston, TX (US); William J. Schaecher, Houston, TX (US); Thanh T. Tran, Houston, TX (US); Krishna Ravi, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 154 days.

(21) Appl. No.: 16/068,839

(22) PCT Filed: Feb. 15, 2016

(86) PCT No.: PCT/US2016/017970
§ 371 (c)(1),
(2) Date: Jul. 9, 2018

(87) PCT Pub. No.: WO2017/142505
PCT Pub. Date: Aug. 24, 2017

(65) Prior Publication Data
US 2019/0017366 A1 Jan. 17, 2019

(51) Int. Cl.
*E21B 47/005* (2012.01)
*E21B 47/11* (2012.01)
(Continued)

(52) U.S. Cl.
CPC .......... *E21B 47/005* (2020.05); *E21B 47/092* (2020.05); *E21B 47/11* (2020.05);
(Continued)

(58) Field of Classification Search
CPC ............. E21B 47/0005; E21B 47/1015; E21B 47/124; E21B 47/0905; E21B 33/14;
(Continued)

(56) References Cited

U.S. PATENT DOCUMENTS

2008/0236814 A1 12/2008 Roddy
2008/0316049 A1* 12/2008 Verret ..................... E21B 47/10
340/854.6

(Continued)

OTHER PUBLICATIONS

International Search Report and Written Opinion for PCT/US2016/017970 dated Oct. 28, 2016.

*Primary Examiner* — Michael R Wills, III
(74) *Attorney, Agent, or Firm* — Thomas Rooney; C. Tumey Law Group PLLC

(57) ABSTRACT

A disclosed subsurface detection system includes a first communication device positioned in a borehole and configured to scan a plurality of frequencies in at least a portion of an annulus surrounding an exterior of a tubing including the casing string in the borehole or an interior of the tubing including the casing string. The plurality of frequencies include a first frequency corresponding to a first type of RFID tag and a second frequency corresponding to a second type of RFID tag. The first communication device is further configured to detect a response to the scan from an RFID tag of the first type or the second type in the portion of the annulus or the interior of the tubing. The system further includes a processor configured to receive communication of the detected response from the first communication device, and based on the detected response, determine one or more characteristics of an environment around the corresponding RFID tag (e.g., an intrinsic impedance of a fluid material in the environment).

20 Claims, 5 Drawing Sheets

(51) Int. Cl.
*E21B 47/13* (2012.01)
*E21B 47/26* (2012.01)
*E21B 47/092* (2012.01)
*H04B 5/00* (2006.01)
*G06K 7/10* (2006.01)
*G06K 19/07* (2006.01)

(52) U.S. Cl.
CPC .............. *E21B 47/13* (2020.05); *E21B 47/26* (2020.05); *G06K 7/10366* (2013.01); *G06K 19/0723* (2013.01); *H04B 5/0062* (2013.01)

(58) Field of Classification Search
CPC ..... E21B 47/122; E21B 47/12; H04B 5/0062; G01V 8/005; G06K 19/0723; G06K 7/10366
See application file for complete search history.

(56) References Cited

U.S. PATENT DOCUMENTS

| | | |
|---|---|---|
| 2009/0211754 A1 | 8/2009 | Verret et al. |
| 2011/0192594 A1* | 8/2011 | Roddy .................... E21B 33/13 166/250.01 |
| 2013/0233538 A1 | 9/2013 | Chatterji et al. |
| 2014/0034823 A1 | 2/2014 | Hyde-Barber |
| 2014/0182845 A1* | 7/2014 | Roberson ................ E21B 33/13 166/250.07 |
| 2014/0354443 A1 | 12/2014 | Roberson et al. |
| 2014/0367092 A1* | 12/2014 | Roberson ................ E21B 47/00 166/250.01 |
| 2016/0040524 A1* | 2/2016 | Ravi ....................... E21B 33/13 166/253.1 |
| 2018/0223650 A1* | 8/2018 | Ravi ....................... E21B 47/10 |

* cited by examiner

METHOD OF DETECTING PRESENCE OF RFID TAGS AND DETERMINING PROPERTIES OF SURROUNDING ENVIRONMENT IN SUBTERRANEAN FORMATION

BACKGROUND

Natural resources such as gas, oil, and water residing in a subterranean formation or zone are usually recovered by drilling a wellbore into the subterranean formation while circulating a drilling fluid in the wellbore. After terminating the circulation of the drilling fluid, a string of pipe (e.g., casing) is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing. Non-cementitious sealants are also utilized in preparing a wellbore. For example, polymer, resin, or latex-based sealants may be desirable for placement behind casing.

To enhance the life of the well and minimize costs, sealant slurries are chosen based on calculated stresses and characteristics of the formation to be serviced. Suitable sealants are selected based on the conditions that are expected to be encountered during the sealant service life. Once a sealant is chosen, it is desirable to monitor and/or evaluate the health of the sealant so that timely maintenance can be performed and the service life maximized. The integrity of sealant can be adversely affected by conditions in the well. For example, cracks in cement may allow water influx, while acid conditions may degrade cement.

BRIEF DESCRIPTION OF THE DRAWINGS

Accordingly, there are disclosed in the drawings and the following description methods and systems employing radio frequency identification device (RFID) tags for monitoring sealant integrity and determining properties of a surrounding environment in a subterranean formation. In the drawings.

Figure 1:
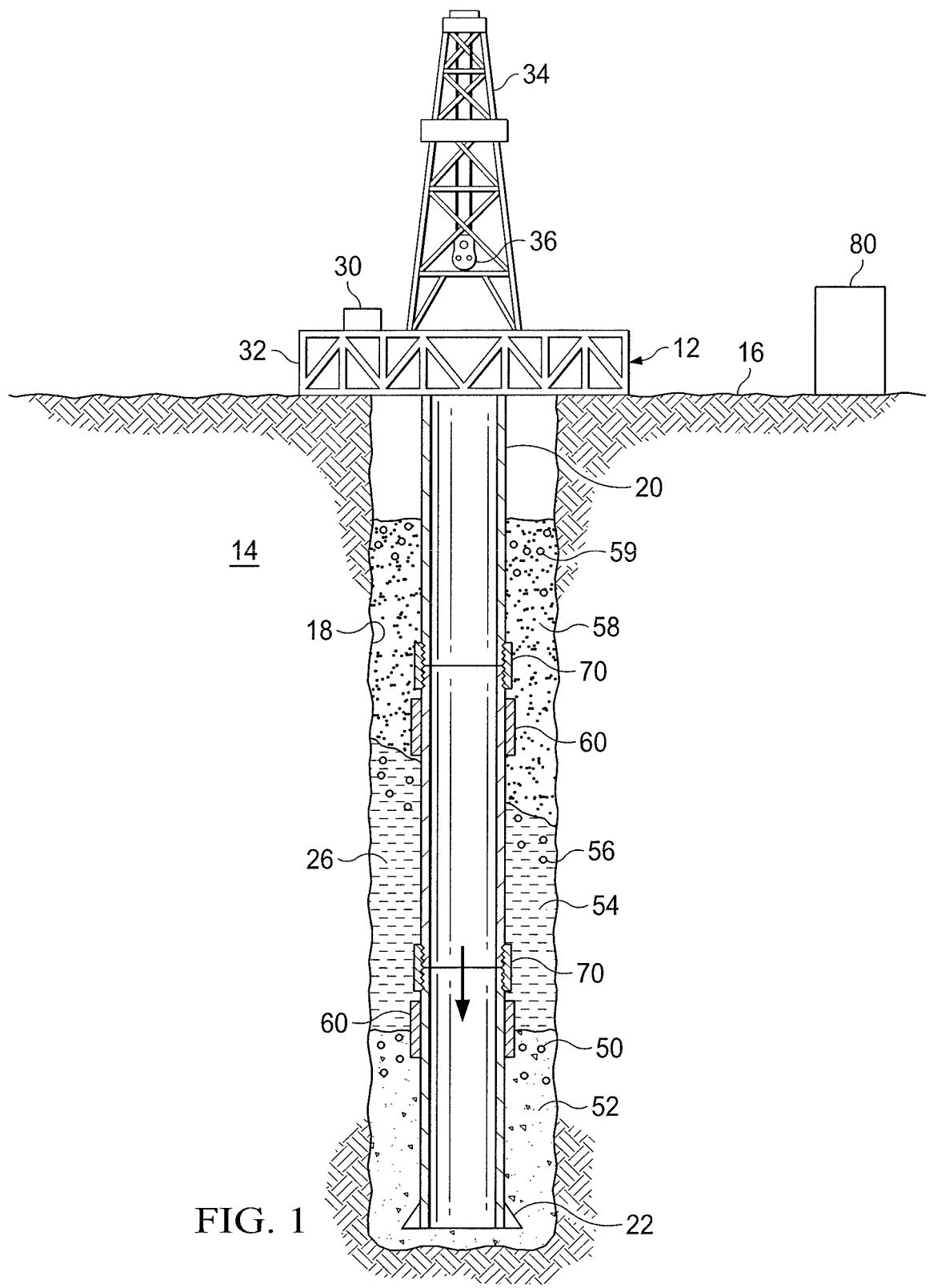
FIG. 1 is a schematic diagram showing an illustrative drilling scenario.

It should be understood, however, that the specific embodiments given in the drawings and detailed description below do not limit the disclosure. On the contrary, they provide the foundation for one of ordinary skill to discern the alternative forms, equivalents, and other modifications that are encompassed in the scope of the appended claims.

DETAILED DESCRIPTION

Disclosed herein are methods and systems employing radio frequency identification devices (RFID) tags for determining the presence of one or more types of RFID tags, one or more properties of a fluid (e.g., a sealant) that is uniquely identifiable by a particular type of RFID tag, and/or properties of a surrounding environment in a subterranean formation. A uniquely identifiable type of tag is embedded in each type of fluid. In at least some embodiments, a method includes scanning a plurality of frequencies in at least a portion of an annulus surrounding an exterior of a tubing including a casing string in the borehole or an interior of the tubing including the casing string, e.g., in the case of reverse cementing. The plurality of frequencies include a first frequency corresponding to a first type of RFID tag and a second frequency corresponding to a second type of RFID tag. The method further includes detecting a response to the scan from an RFID tag of the first type or an RFID tag of the second type in the portion of the annulus or the interior of the tubing. The method further includes, based on the detected response, determining one or more characteristics of an environment around the corresponding RFID tag. The one or more characteristics include an intrinsic impedance of a fluid material in the environment around the corresponding RFID tag. A related system includes a first communication device positioned in a borehole and configured to scan a plurality of frequencies in at least a portion of an annulus surrounding an exterior of a tubing including a casing string in the borehole or an interior of the tubing including the casing string, e.g., in the case of reverse cementing. The plurality of frequencies include a first frequency corresponding to a first type of RFID tag and a second frequency corresponding to a second type of RFID tag. The first communication device is further configured to detect a response to the scan from an RFID tag of the first type or an RFID tag of the second type in the portion of the annulus or the interior of the tubing. The system further includes a processor configured to receive communication of the detected response from the first communication device, and based on the detected response, determine one or more characteristics of an environment around the corresponding RFID tag. The one or more characteristics include an intrinsic impedance of a fluid material in the environment around the corresponding RFID tag.

FIG. 1 is a schematic diagram showing an illustrative drilling scenario. Wellbore 18 has been drilled through various earth strata, including a subterranean oil or gas formation 14 located below the earth's surface 16. A rig 12 is centered over the formation 14. The rig 12 includes a work deck 32 that supports a derrick 34. The derrick 34 supports a hoisting apparatus 36 for raising and lowering pipe strings such as casing (or casing string) 20. A pump 30 is capable of pumping a variety of wellbore compositions (e.g., drilling fluid or cement) into the well and includes a pressure measurement device that provides a pressure reading at the pump discharge.

Upon completion of wellbore drilling, the casing 20 may be placed in the wellbore 18 to facilitate the production of oil and gas from the formation 14. The casing 20 includes a string of pipes that extends down the wellbore 18, through which oil and gas will eventually be extracted. A cement or casing shoe 22 may be attached to the end of the casing 20 when the casing is run into the wellbore 18. The casing shoe 22 guides the casing 20 toward the center of the hole and may minimize problems associated with hitting rock ledges or washouts in the wellbore 18 as the casing is lowered into the well. The casing shoe 22 may be a guide shoe or a float shoe, and may include a tapered (e.g., bullet-nosed piece) of equipment found on the bottom of the casing 20. The annulus 26 is a region between the casing 20 and the wall of the wellbore 18. To fill up the annulus 26 and to secure the casing 20 in place, the casing 20 may be "cemented" in the wellbore 18, which is referred to as "primary cementing." As will be described in more detail later, an acoustic detection tool (e.g., acoustic detection tool 210 of FIG. 2) may be placed in the casing 20.

To monitor primary cement during and/or subsequent to a primary cementing operation, micro-electromechanical systems (MEMS) sensors 50 may be employed. For example, the MEMS sensors may be mixed into a cement slurry 52, which may then be pumped down the inside of the casing 20. In addition, as illustrated in FIG. 1, MEMS sensors 56 and 59 may be present in spacing fluid 54 and mud 58, respectively, within annulus 26. Accordingly, MEMS sensor may be added in a wellbore servicing fluid and pumped down the casing. In this manner, the MEMS sensors 50 are utilized to uniquely identify a presence of the cement slurry 52. Similarly, the MEMS sensors 56 and 59 are utilized to uniquely identify a presence of the spacing fluid 54 and a presence of the mud 58, respectively. In the following disclosure, various features will be described with reference to MEMS sensors 50. However, it is understood that such features are equally applicable to MEMS sensors 56 and 59.

As the cement slurry 52 reaches the bottom of the casing 20, the slurry flows out of the casing 20 and into the annulus 26 between casing 20 and the wall of wellbore 18. The valve of the casing shoe 22 prevent reverse flow, or U-tubing, of cement slurry 52 from the annulus 26 into the casing 20. As the cement slurry 52 flows up annulus 26, the slurry displaces any fluid (e.g., spacing fluid 54) in the wellbore. To ensure that no cement remains inside casing 20, devices known as "wipers" may be pumped by a wellbore servicing fluid (e.g., drilling mud) through the casing 20 behind the cement. The wiper contacts the inside surface of the casing 20 and pushes any remaining cement out of the casing. When the cement slurry 52 reaches the earth's surface 16, and the annulus 26 is filled with the slurry, pumping is terminated and the cement is allowed to set. This process can be reversed where the cement can be pumped from the annulus.

During cementing, or after the setting of cement, an acoustic detection tool (e.g., acoustic detection tool 210 of FIG. 2) may be positioned in the wellbore 18. For example, the wiper may be equipped with such an acoustic detection tool while being pumped downhole. A sensor unit 60 is located on the casing 20 (e.g., on an exterior or interior surface of the casing). The sensor unit 60 may be signaled to interrogate the MEMS sensors 50, which activates the sensors to record and/or transmit data to the sensor unit. In this situation, the acoustic detection tool reads the data from the sensor unit 60. The acoustic detection tool transmits the data received from the sensor box 60 to the surface 16 (e.g., to a computer 80). The data is monitored (e.g., in real-time) to track movement of the cement slurry 52 out from the casing 20 and into the annulus 26. For example, the locations of the MEMS sensors 50 are calculated from the data, and the locations are monitored periodically to verify that the cement slurry 52 is pushed from the casing 20 and/or is settled in the annulus 26. Data sensor (and likewise cement slurry) position and cement integrity may be determined by analyzing sensed parameters for changes, trends, expected values, etc.

Such data may reveal conditions that may be adverse to cement curing. For example, the sensors may provide a temperature profile over the length of the cement sheath. A uniform temperature profile may indicate a uniform cure (e.g., produced via heat of hydration of the cement during curing). A change in temperature over the length of the cement sheath may indicate an anomaly such as a presence of undisplaced mud, a presence of undisplaced spacing fluid, contaminated cement, and/or an influx of formation fluid. For example, at a particular time, detecting a presence of an RFID tag (the type of which uniquely corresponds to mud) may lead to a determination that undisplaced mud is present. As another example, at a particular time, detecting a presence of another RFID tag (the type of which uniquely corresponds to the spacing fluid) may lead to a determination that undisplaced spacing fluid is present.

Although FIG. 1 has been described with reference to an onshore drilling scenario, it is understood that features described in this disclosure are equally applicable to offshore rigs and wellbores.

With continued reference to FIG. 1, regional communication units (e.g., sensor units 60) may be situated on the casing 20 and spaced at regular or irregular intervals along the casing 20 (e.g., about every 5 m to 15 m, about every 8 m to 12 m, or about every 10 m along the length of the casing 20). The regional communication units may be situated on or in casing collars 70 that couple casing joints together. In addition, the regional communication units may be situated in an interior of the casing 20 and/or on an exterior of the casing 20. An acoustic detection tool (e.g., acoustic detection tool 210 of FIG. 2) may be lowered down into the wellbore 18 on a wireline (e.g., wireline 222 of FIG. 2). A processor or other data storage or communication device, located, e.g., at computer 80, is coupled to the acoustic detection tool. The processor may be located at the earth's surface 16.

Each regional communication unit interrogates and/or receives data from data sensors 50 (e.g., MEMS sensors) that are situated in the annulus 26, within communication range of the sensor box. The data sensors 50 may transmit sensor data to neighboring data sensors 50, as well as to regional communication units that are within communication range. The data sensors 50 may be passive sensors that are powered by bursts of electromagnetic (EM) radiation from the regional communication units. Alternatively, the data sensors 50 may be active sensors that are powered by batteries situated in or on the data sensors, or by other downhole power sources.

The regional communication units communicate with each other, with the acoustic detection tool, and to the processor or other surface equipment. These communications may be wireless. Alternatively, these communications may occur via one or more wired interfaces. The regional communication units may be powered by batteries, which enable the regional communication units to interrogate the data sensors 50 and/or to receive sensor data from the data sensors 50. In this situation, the batteries of the regional communication units may be inductively rechargeable by the acoustic detection tool, or may be rechargeable by other downhole power sources.

As described earlier, the data sensors 50 may be active sensors. In this situation, low-powered (e.g., nanowatt) electronic moisture sensors may be used. However, such sensors may possibly pose inherent limitations when embedded within certain media (e.g., cement). For example, a highly alkali environment may damage the electronics of such sensors. Also, these sensors may be sensitive to EM noise. Additionally, inclusion of an internal battery (for powering the sensor to activate, and to transmit data) may increase sensor size, as well as decrease the useful life of the sensor.

Alternatively, the data sensors 50 may be passive sensors. For example, a passive RFID tag uses an RF signal received from an interrogator (e.g., a regional communication unit, an acoustic detection tool) to power itself. If the data sensors 50 that are added to the wellbore composition, e.g., sealant slurry, etc., are passive sensors, then the data sensors do not require continuous power from a battery or some other external source, in order to transmit real-time data.

Whether the data sensors 50 are active or passive, the data sensors may be MEMS sensors that include one or more one or more MEMS devices. Examples of MEMS devices are semiconductor devices with mechanical features on the micrometer scale. MEMS devices embody the integration of mechanical elements, sensors, actuators, and electronics on a common substrate (e.g., a silicon substrate). MEMS elements include mechanical elements which are movable by an input energy (electrical energy or other type of energy). Using MEMS, a sensor may be designed to emit a detectable signal based on a number of physical phenomena, including thermal, biological, optical, chemical, and magnetic effects or stimulation. MEMS devices are minute in size, have low power requirements, are relatively inexpensive and are rugged. Therefore, MEMS devices are well suited for use in wellbore servicing operations.

The data sensors 50 may include an active material connected to (e.g., mounted within or mounted on the surface of) an enclosure. The active material may be configured to respond to a wellbore parameter, and may be operably connected to (e.g., in physical contact with, surrounding, or coating) a capacitive MEMS element. The data sensors 50 may sense one or more parameters (e.g., temperature, pH, moisture content, ion concentration (e.g., chloride, sodium, and/or potassium ions, cement characteristic data such as stress, strain, or combinations thereof) within the wellbore. When the data sensors 50 include active materials that respond to two or more of such parameters, more than one parameter may be measured.

Alternatively (or in addition), the data sensor 50 incorporated within one or more wellbore compositions disclosed herein may provide information that allows a condition (e.g., thickness, density, volume, settling, stratification, etc.) and/or location of the composition within the subterranean formation to be detected. As will be described in more detail later, the detection of a signal corresponding to a particular sensor may be used to determine the presence of a corresponding composition.

Suitable active materials, such as dielectric materials, that respond in a predictable and stable manner to changes in parameters over a long period may be identified according to known methods, for example see, Ong, Zeng and Grimes, "A Wireless, Passive Carbon Nanotube-based Gas Sensor," IEEE Sensors Journal, 2, 2, (2002) 82-88; Ong, Grimes, Robbins and Singl, "Design and application of a wireless, passive, resonant-circuit environmental monitoring sensor," Sensors and Actuators A, 93 (2001) 33-43. MEMS sensors that respond to various wellbore parameters are also described in U.S. Pat. No. 7,038,470 to Johnson.

The data sensors 50 may be coupled with RFIDs to detect and/or measure parameters, and to transmit such data (e.g., cement characteristic data for monitoring the cement during its service life). RFIDs combine a microchip with an antenna. The RFID chip and the antenna are collectively referred to as a "transponder" or a "tag." The antenna provides the RFID chip with power when exposed to RF energy (e.g., a narrow band, high frequency EM field) from a transmitting device (e.g., regional communication unit). A dipole antenna or a coil that is connected to the RFID chip powers the tag when current is induced in the antenna by the RF signal.

In response, the data sensor 50 returns a unique identification (e.g., a unique response, a response uniquely generated by modulating and re-radiating the RF wave). The data sensor and the RFID tag may be integrated into a single component (e.g., chip or substrate). Alternatively, the data sensor and the RFID tag may be separate components that are operably coupled to each other. An integrated, passive MEMS/RFID sensor may include a data sensing component, an optional memory, and an RFID antenna. At the RFID antenna, excitation energy that is received powers up the sensor. The sensor may then sense a present condition, access one or more stored sensed conditions from memory, and/or transmit a response (e.g., providing data/indicator(s) relating to the condition) via the RFID antenna.

In at least some embodiments, the RFID tag operates as a resonator that has a resonant frequency. In this regard, a transmitting device (e.g., regional communication unit) interrogates the RFID tag by transmitting an RF signal that provides sufficient energy to excite the RFID tag. The RF signal causes the RFID tag to transmit a response. The response may be detected at a receiving device (e.g., regional communication unit) performing an RF sweep that scans one more frequency bands. If the resonant frequency of the RFID tag is within the scanned frequency band(s), then the response is detected at the receiving device. In at least some embodiments, it is accordingly determined that the RFID tag is present (e.g. in the vicinity of the interrogator (transmitting device)).

Figure 2:
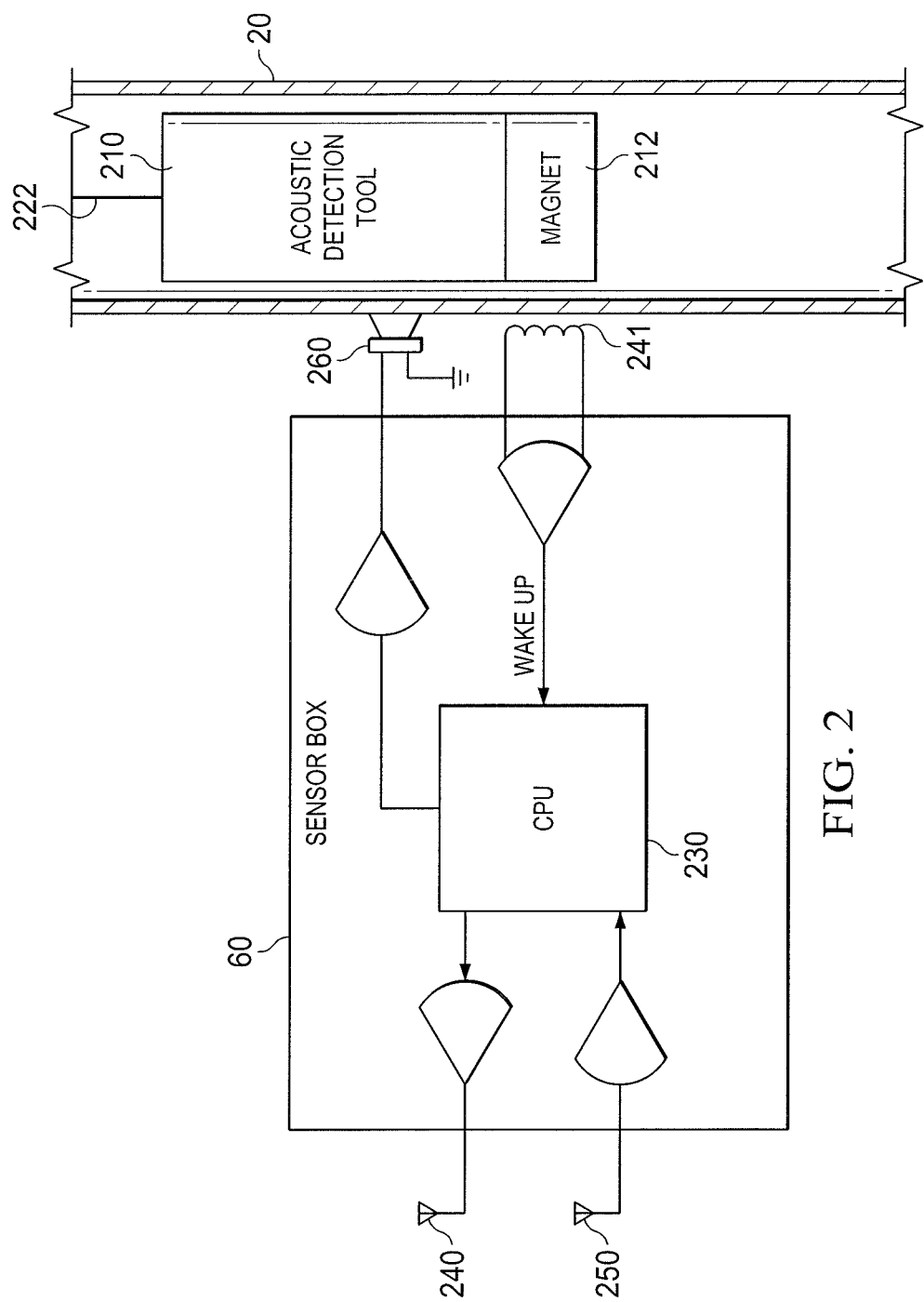
FIG. 2 is a schematic diagram showing an illustrative sensing/communication scenario.

FIG. 2 is a schematic diagram showing an illustrative sensing/communication scenario. A tool (e.g., acoustic detection tool 210) is lowered into the casing 20 to interrogate regional communication units (sensor units 60) and to receive sensor data stored by the regional communication units.

The acoustic detection tool 210 includes a magnet 212. A lowering (or raising) of the acoustic detection tool 210 into the casing 20 brings the magnet 212 in proximity to an inductor 241 (e.g., a wire coil). Accordingly, a magnetic field produced by the magnet 212 is detected by the inductor 241. The inductor 241 is coupled to the sensor unit 60. For example, the inductor 241 is coupled to the sensor unit 60, such that a voltage induced by the magnetic field is received by the sensor unit. As illustrated in the scenario of FIG. 2, the sensor unit 60 includes a processing unit 230. When the value of the voltage exceeds a particular threshold, the processing unit 230 is caused to wake up (e.g., become active). Upon waking up, the processor unit 230 sends a signal to a transmit antenna 240 for transmission by the transmit antenna. This signal may be, e.g., an RF signal for powering one or more data sensors 50.

Upon waking up, the processor unit 230 is also activated to receive a signal(s) that is received by the receive antenna 250. The signal may carry, e.g., data from one or more data sensors 50. In response, the processing unit 230 drives the signal to a transducer 260, which, in turn, produces sounds onto the casing 20. The sounds are detected by the acoustic detection tool 210, which converts the detected sounds to digital information that is conveyed to the surface (e.g., processor of computer 80).

The acoustic detection tool 210 transmits the sensor data to the processor (e.g., computer 80) for further processing. The acoustic detection tool 210 may communicate with, power up, and/or gather data from the sensor unit 60. The data gathered from the sensor unit 60 may have been produced by various data sensors 50 distributed within the annulus 26 and/or the casing 20.

In at least some embodiments, the tool is an acoustic detection tool. More generally, the tool is an interrogation tool that employs any of various telemetry techniques (e.g., induction, RF, etc). Further, the tool may intervene by recovering data after a cementing operation is completed. Alternatively, the tool may recover sensor data in real-time as a cementing operation is in progress.

Figure 3:
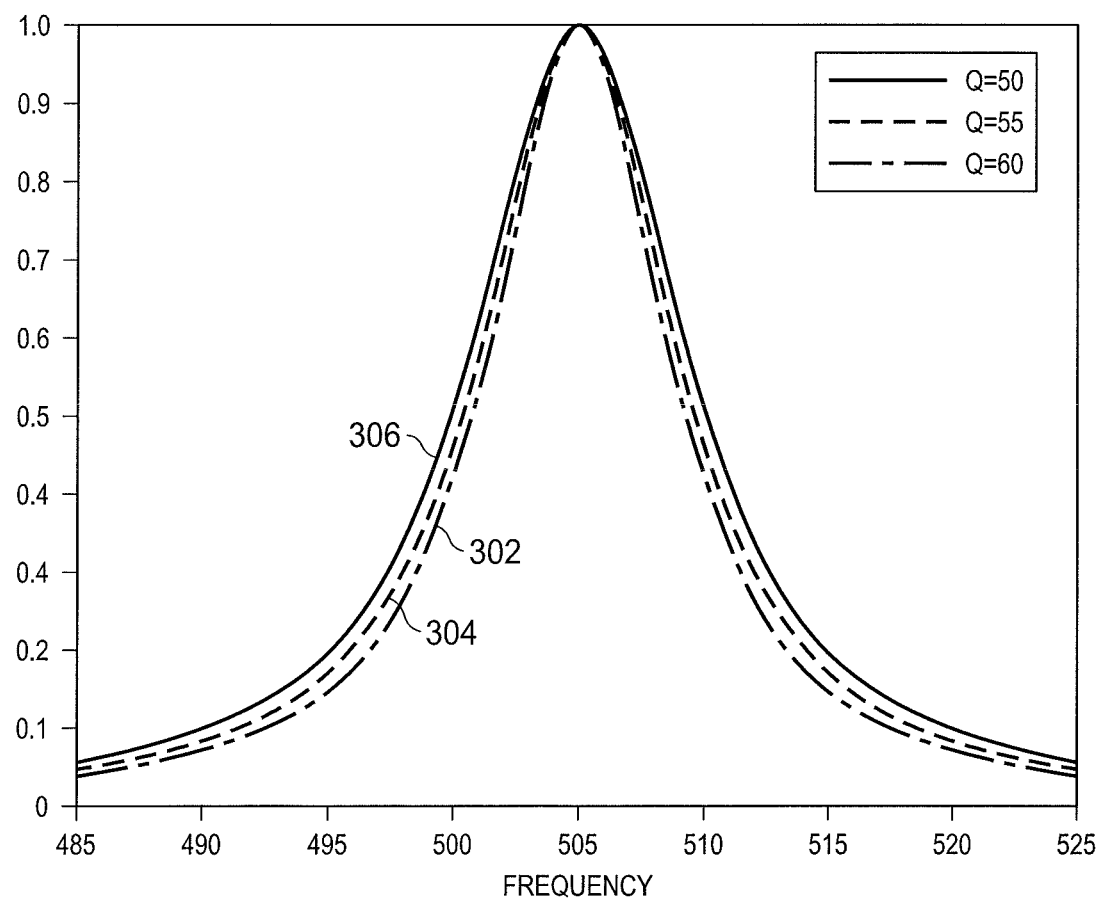
FIG. 3 shows illustrative responses of an RFID tag.

FIG. 3 shows illustrative responses 302, 304, 306 of an RFID tag. The RFID tag has a resonant frequency of 505 MHz. As illustrated in FIG. 3, the response 302 has a shape of a bell curve. With respect to frequency, the most dominant component of the response 302 is located at its center (at the resonant frequency). Also with respect to frequency, the response 302 decays in a symmetrical manner leading away in either direction from the resonant frequency.

The rate at which the response 302 decays is a function of a Q-factor of the resonator. The higher the Q-factor value, the faster the rate of decay. Therefore, a higher Q-factor value corresponds to a response having a narrower bandwidth. Components of the response 302 that are present at lower frequencies may be a function of the Q-factor of the RFID tag and the rate of the RF sweep in the time-domain. Such lower-frequency components may be suitable for processing at a processor that is not necessarily configured to process higher-frequency signals.

With continued reference to FIG. 3, at different times and/or under different conditions, responses 304, 306 may be produced by the same RFID tag. The responses 304, 306 are characterized by the same resonant frequency (e.g., 505 MHz). However, with respect to the response 302, the responses 304, 306 have different resonator Q-factor values. Among the responses 302, 304, 306, the response 302 has a highest Q-factor value (e.g., a Q-factor value of 60). Accordingly, the response 302 has a narrowest bandwidth and decays more quickly than responses 304, 306. Among the responses 302, 304, 306, the response 306 has a lowest Q-factor value (e.g., a Q-factor value of 50). Accordingly, the response 306 has a least narrow bandwidth, and decays less quickly than responses 302, 304.

The Q-factor of a response of a particular RFID tag may change, e.g., due to changes in the environment surrounding the RFID tag. For example, a change in the temperature of the environment may cause changes in the resonator resistance, and, therefore, changes in the Q-factor of the response. Therefore, due to a change (e.g., increase) in temperature, the behavior of a response transmitted by the RFID tag may be closer to the behavior of response 302 than to that of response 304. If a response that is more similar to response 302 (than to response 304) is detected at a receiving device, then it may be determined not only that the RFID tag is present (e.g., in the vicinity of the transmitting device), but also that the temperature of the environment has changed (e.g., increased). In at least some embodiments, the sweep profile of an RF sweep that is performed by the receiving device has sufficient tolerance, so that the RF sweep can accommodate the different characteristics (e.g., Q-factor) of a response that may be produced by a particular RFID.

As described earlier, an RF sweep may be performed by a receiving device. The receiving device may be one or more of the regional communication units (e.g., sensor unit 60). With reference back to FIGS. 1 and 2, the regional communication unit may scan a plurality of frequencies for at least one RFID tag, in order to identify the presence of one or more RFID tags in a portion of the annulus 26 surrounding the casing 20 in the borehole 18. In this regard, the sweep may be a single sweep (e.g., a continuous sweep) that targets the respective resonant frequencies (e.g., unique resonant frequencies) of two or more RFID tags. Alternatively, the sweep may be one of multiple, individual sweeps that are performed (e.g., as part of a sequence). Each of the individual sweeps targets the resonant frequency of a particular RFID tag (e.g., an RFID tag that was provided in the borehole 18 along with a particular composition). Whether a single continuous sweep or a sequence of individual sweeps is performed may depend on the separation in frequency between resonant frequencies. For example, a single continuous sweep may be performed to scan for RFID tags having resonant frequencies that are relatively close to one another. As another example, a sequence of individual sweeps may be performed to scan for RFID tags having resonant frequencies that are relatively far away from one another.

Figure 4:
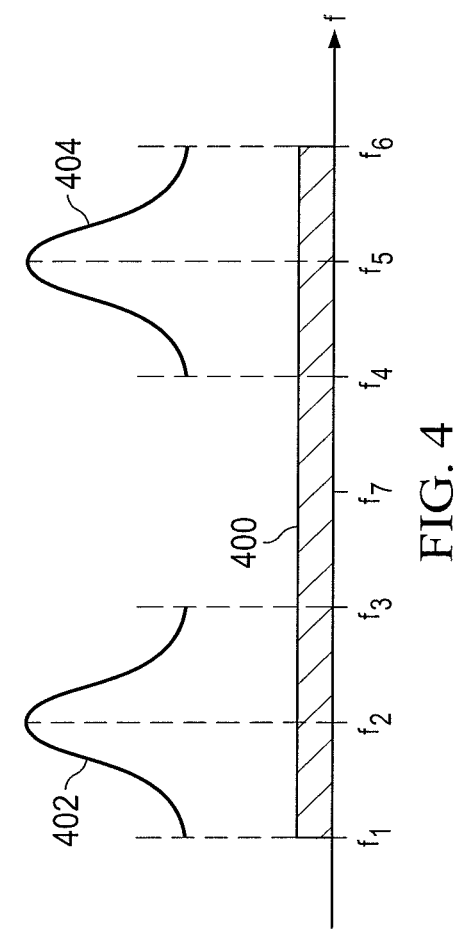
FIG. 4 illustrates an example of a continuous sweep.

FIG. 4 illustrates an example of a continuous sweep. The sweep 400 scans frequencies in a frequency band that ranges from $f_1$ to $f_6$. Included in this band is the resonant frequency $f_2$ of a first RFID tag. The first RFID tag transmits a response 402 upon excitation. Also included in the scanned frequency band is the resonant frequency $f_5$ of a second RFID tag. The second RFID tag transmits a response 404 upon excitation. Accordingly, the profile of the sweep 400 is configured to target the resonant frequencies of the first and the second RFID tags. As illustrated in FIG. 4, the response 402 of the first RFID tag and the response 404 of the second RFID tag are nonoverlapping in frequency.

In addition, the sweep profile may have sufficient tolerance to account for the different characteristics (e.g., Q-factor) of the responses of the first and second RFID tags. For example, the frequency $f_1$ may be selected to be sufficiently low to accommodate the maximum expected bandwidth (e.g., lowest Q-factor value) of the response of the first RFID tag. Similarly, the frequency $f_6$ may be selected to be sufficiently high to accommodate the maximum expected bandwidth (e.g., lowest Q-factor value) of the response of the second RFID tag. Accordingly, the scanned frequency band of $f_1$ to $f_6$ covers bandwidths of both the first and second RFID tags.

Figure 5:
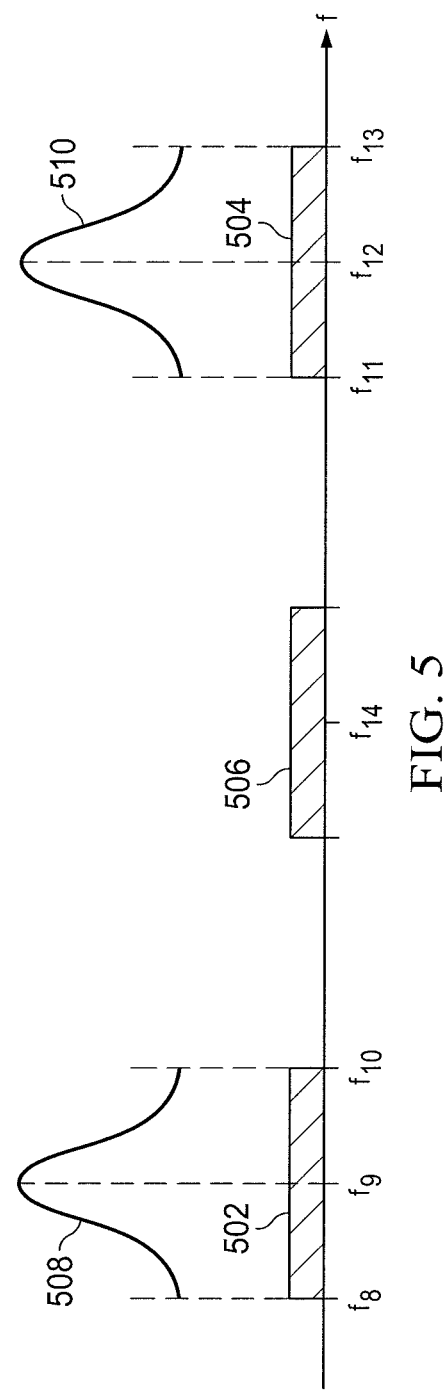
FIG. 5 illustrates an example of a sequence of individual sweeps.

FIG. 5 illustrates an example of individual sweeps 502, 504. The sweeps 502, 504 are performed separately (e.g., as part of a particular sequence). The sweep 502 scans frequencies in a frequency band that ranges from $f_8$ s to $f_{10}$. Included in this band is the resonant frequency $f_9$ of a third RFID tag. The third RFID tag transmits a response 508 upon excitation. Accordingly, the profile of the sweep 502 is configured to target the resonant frequency of the third RFID tag. The sweep 504 scans frequencies in a frequency band that ranges from $f_{11}$ to $f_{13}$. Included in this band is the resonant frequency $f_{12}$ of a fourth RFID tag. The fourth RFID tag transmits a response 510 upon excitation. Accordingly, the profile of the sweep 504 is configured to target the resonant frequency of the fourth RFID tag.

In addition, the profile of the sweeps 502, 504 may have sufficient tolerance to account for the different characteristics (e.g., Q-factor) of the responses of the third and fourth RFID tags. For example, the frequencies $f_8/f_{10}$ may be selected to be sufficiently low/high to accommodate the maximum expected bandwidth (e.g., lowest Q-factor value) of the response of the third RFID tag. Accordingly, the scanned frequency band of the sweep 502 covers a bandwidth of the third RFID tag. Similarly, the frequencies $f_{11}/f_{13}$ may be selected to be sufficiently low/high to accommodate the maximum expected bandwidth (e.g., lowest Q-factor value) of the response of the fourth RFID tag. Accordingly, the scanned frequency band of the sweep 504 covers a bandwidth of the fourth RFID tag.

Signals that are received in response to a performed sweep(s) are processed to detect the presence of an RFID tag, characteristics of the environment surrounding the tag, and/or and the distance between the tag and the transmitting device.

Detection of the presence of an RFID tag (and, therefore, the presence of a particular composition) will now be described in more detail with reference back to FIG. 4.

As described earlier, frequencies ranging from $f_1$ to $f_6$ are scanned as part of the sweep 400. If the RFID tag corresponding to response 402 is present (e.g., in the vicinity of the transmitting device), then the RFID tag emits the response 402 upon excitation. Detection of the emitted response 402 (e.g., detection of a response sufficiently similar to the response 402) during performance of the sweep 400 leads to a determination that the RFID tag is present in the vicinity of the transmitting device. If it is known that the RFID tag had been provided in the wellbore together with a particular composition (e.g., cement slurry, mud, spacer), then it is determined that the composition is present in the vicinity of the transmitting device. In contrast, if a response bearing sufficient similarity to response 402 is not detected, then it is determined that the RFID tag is not present in the vicinity of the transmitting device. If it is known that the RFID tag had been placed in the wellbore together with the particular composition, then it is determined that the composition is not present in the vicinity of the transmitting device.

Similarly, if an RFID tag corresponding to response 404 is present (e.g., in the vicinity of the transmitting device), then the RFID tag emits the response 404 upon excitation. Detection of the emitted response 404 (e.g., detection of a response sufficiently similar to the response 404) during performance of the sweep 400 leads to a determination that the RFID tag is present in the vicinity of the transmitting device. If it is known that the RFID tag had been placed in the wellbore together with a particular composition (e.g., cement slurry, mud, spacer), then it is determined that the composition is present in the vicinity of the transmitting device. In contrast, if a response bearing sufficient similarity to response 404 is not detected, then it is determined that the RFID tag is not present in the vicinity of the transmitting device. If it is known that the RFID tag had been placed in the wellbore together with the particular composition, then it is determined that the composition is not present in the vicinity of the transmitting device.

With reference to FIG. 5, determination as to the presence of RFID tags corresponding to responses 508, 510 during performance of sweeps 502, 504 may be performed in a manner similar to that described earlier with reference to FIG. 4.

When employed during a cementing application in an oil well, RFID tags may be used to provide feedback about the placement of the cement and proper sealing of the formation, the curing of the cement (e.g., a degree to which cement slurry is cured), and condition of the cement over the life of the well. For example, in a section of the annulus that is supposed to be cemented, a detected presence of one or more RFID tag(s) that correspond to a composition(s) other than cement may indicate a risk to zonal isolation.

If the presence of an RFID tag is detected in response to a sweep, the results of the sweep (including, e.g., the response of the RFID tag) may be further processed to detect other characteristics. In at least some embodiments, these other characteristics relate to an environment surrounding the tag and/or the distance from the tag to the interrogator.

Regarding the environment surrounding the tag, one characteristic may be an intrinsic impedance of a medium in the environment. A medium through which EM waves propagate has an intrinsic impedance ($\eta$) or EM impedance. The intrinsic impedance of the medium is a function of the medium's magnetic permeability ($\mu$), electrical permittivity ($\varepsilon$) and electrical conductivity ($\sigma$). The intrinsic impedance is also a function of the frequency ($\omega$) of the EM wave. An expression for calculating the intrinsic impedance is expressed in Equation 1 below.

$$\eta = \sqrt{\frac{j\omega\mu}{\sigma + j\omega\varepsilon}} \tag{1}$$

During RF propagation, the power delivered to a matched receiver (Pr) may be a function of an electric field per unit area (E), an area (A), and the medium intrinsic impedance ($\eta$). The power delivered to the matched receiver (Pr) may be also be expressed as a function of the transmitted power (Pt), a receive antenna gain (Gr), a transmit antenna gain (Gt), a distance between transmitter and receiver (d), a frequency of the RF wave (expressed as a wavelength $\lambda$) and the medium's intrinsic impedance ($\eta$). An expression for calculating the delivered power (Pr) is expressed in Equation 2 below.

$$Pr = \frac{E^2 A}{\eta} = \frac{30\, Pt\, Gt\, \lambda^2 Gr}{\eta\, d^2\, 4\pi} \tag{2}$$

Based on Equation 2 above, the medium's intrinsic impedance ($\eta$) may be determined based on known parameters (e.g., received power, transmitted power, etc.) For example, such parameters may be obtained during performance of a sweep that detects a response transmitted by/received from an RFID tag (e.g., response 404, 404, 502, 504). A distance between the transmitter (e.g., transmit antenna 240 of sensor unit 60) and the receiver (e.g., receive antenna 250 of sensor unit 60) is known. In this situation, the transmit antenna 240 and the receive antenna 250 may be coupled to a same sensor unit 60. Alternatively, the transmit antenna 240 and the receive antenna 250 are coupled to different sensor units 60. In either situation, the distance (d) between the transmitter and the receiver is known. The parameters may be used to determine the intrinsic impedance of a medium in the environment surrounding the tag. Determining the intrinsic impedance may be useful in identifying the medium itself. For example, a particular value of intrinsic impedance may correspond to one or more possible media that could be present in the environment.

In addition, changes in the intrinsic impedance may be indicative of changes in the environment. For example, during or after cementing, if formation fluids were to enter the annulus, the impedance of the surrounding environment may change. Accordingly, such a change in the impedance may indicate the entry (or influx) of formation fluids. As another example, when cement is curing, water is consumed in the hydration process, causing the impedance of the surrounding environment to change. Accordingly, in at least some embodiments, such a change in the impedance is interpreted as an indication of progress in the curing of the cement.

Although the determination of the intrinsic impedance has been described with reference to using signals transmitted/received at or around resonant frequencies (e.g., response 404, 404, 502, 504), it is understood that signals transmitted/received at other frequencies (e.g., frequencies that are substantially outside of the bandwidths of the responses) may also be used. For example, with reference to FIG. 4, signals transmitted/received at frequency $f_7$ may be used. The frequency $f_3$ is scanned during performance of the sweep 400. The frequency $f_7$ is significantly outside of the respective bandwidths of responses 402, 404. As another example, with reference to FIG. 5, signals transmitted/received at frequency $f_{14}$ may be used. The frequency $f_{14}$ is scanned during performance of a sweep 506, which may be performed separately from sweeps 502 and 504. The frequency $f_9$ is substantially outside of the bandwidths of responses 502, 504.

In addition, analysis of reflected waves may be used in identifying multiple layers of media. In RF propagation, when a plane wave passes from a first medium (having a certain intrinsic impedance) to a second medium (having a different intrinsic impedance), a portion of the wave energy is reflected back through the first medium, and a remainder of the wave energy is transmitted (passed) through the second medium. Measuring a reflected component and a pass-through component may be used in identifying whether multiple layer of media are present, as well as estimating the thicknesses of the multiple media layers.

In addition, a distance of an identified RFID tag relative to an interrogating device may be determined. For example, the location of the tag may be identified based on a location of a transmitting device and locations of two or more receiving devices. Knowledge of the position of a detected RFID tag may be helpful during cement placement, e.g., when the presence of a composition (e.g., a fluid other than cement) at a particular location may indicate placement issues.

Figure 6:
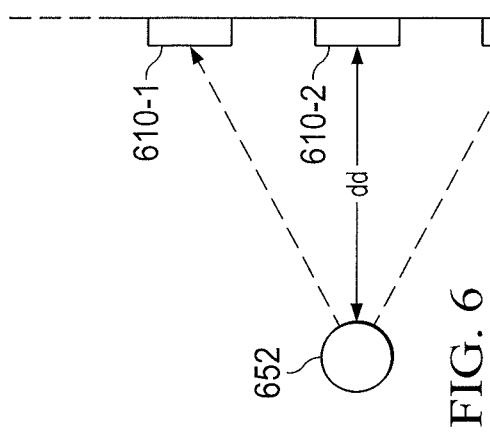
FIG. 6 illustrates a triangulation scenario.

FIG. 6 illustrates a triangulation scenario. A triangulation algorithm may be used to determination the location of an RFID tag 652. A regional communication unit 610-2 produces RF energy that excites the RFID tag 652. Accordingly, the RFID tag 652 transmits a response which is detected by regional communication units 610-1 and 610-3. The locations of regional communication units 610-1, 610-2, 610-3 are known.

Based on the signals received from the RFID tag 652, the regional communication units 610-1 and 610-3 and/or a processor (e.g., processor 630) may use a triangulation algorithm to determine the location of the RFID tag 652 and the distance dd between the RFID tag and the regional communication unit 610-2.

Figure 7:
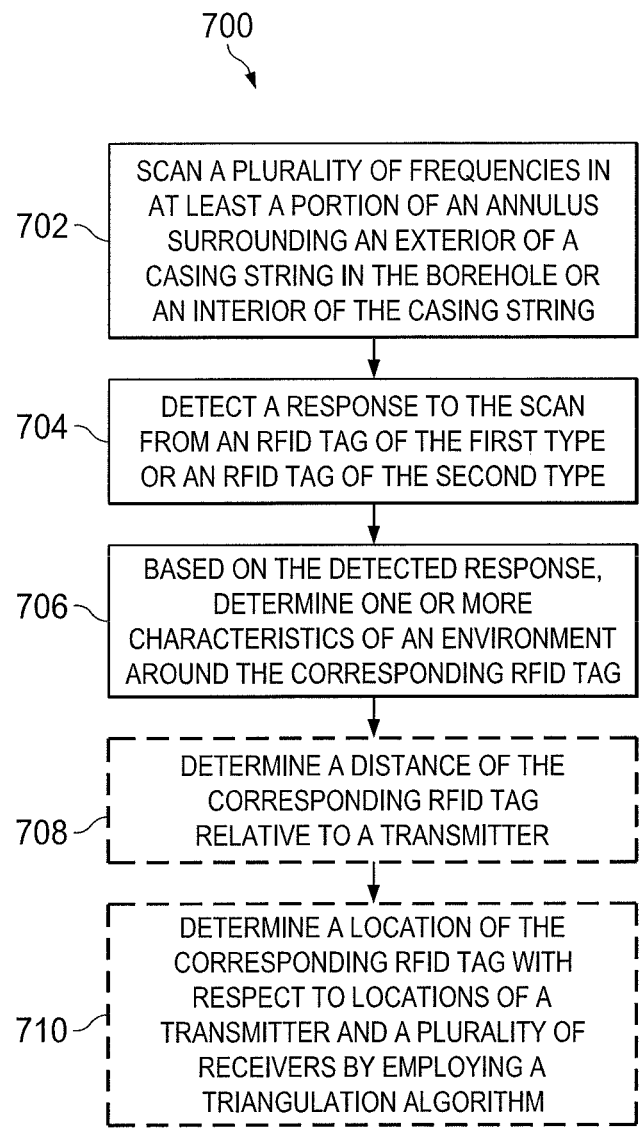
FIG. 7 is a flowchart showing an illustrative detection method employing an RFID tag.

FIG. 7 is a flowchart 700 showing an illustrative scanning and/or detection method employing an RFID tag. In the method 700, a plurality of frequencies are scanned in at least a portion of an annulus surrounding an exterior of a tubing including a casing string in the borehole or an interior of the tubing including the casing string at block 702. The plurality of frequencies include a first frequency corresponding to a first type of RFID tag (e.g., MEMS sensors 50) and a second frequency corresponding to a second type of RFID tag (e.g., MEMS sensors 56 or 59). At block 704, a response to the scan from an RFID tag of the first type or an RFID tag of the second type is detected. At block 706, one or more characteristics of an environment around the corresponding RFID tag are determined, based on the detected response. The one or more characteristics include an intrinsic impedance of a fluid material in the environment around the corresponding RFID tag.

The determination of the one or more characteristics may include measuring a received power of the detected response from the first RFID tag and determining the intrinsic impedance of the fluid material based on the measured received power.

If the fluid material includes a cement slurry, then determining the one or more characteristics may further include determining, based on the determined intrinsic impedance, a degree to which the cement slurry is cured, a level of fluid influx into the environment during or after cementing, or a condition of a cement as it changes from liquid to solid.

With regard to block 708, a distance of the corresponding RFID tag relative to a transmitter (e.g., regional communication unit 610-2) may be determined.

With regard to block 712, a location of the corresponding RFID tag with respect to locations of a transmitter (e.g., regional communication unit 610-2) and a plurality of receivers (e.g., regional communication unit 610-1 and 610-3) may be determined. The determination of the location of the corresponding RFID tag may include employing a triangulation algorithm.

Embodiments disclosed herein include:

A: A system that includes a first communication device positioned in a borehole and configured to scan a plurality of frequencies in at least a portion of an annulus surrounding an exterior of a tubing including a casing string in the borehole or an interior of the tubing including the casing string. The plurality of frequencies include a first frequency corresponding to a first type of RFID tag and a second frequency corresponding to a second type of RFID tag. The first communication device is further configured to detect a response to the scan from an RFID tag of the first type or an RFID tag of the second type in the portion of the annulus or an interior of the tubing. The system further includes a processor configured to receive communication of the detected response from the first communication device, and based on the detected response, determine one or more characteristics of an environment around the corresponding RFID tag. The one or more characteristics include an intrinsic impedance of a fluid material in the environment around the corresponding RFID tag.

B. A method of detecting RFID tags in a borehole that includes scanning a plurality of frequencies in at least a portion of an annulus surrounding an exterior of a tubing including a casing string in the borehole or an interior of the tubing including the casing string. The plurality of frequencies include a first frequency corresponding to a first type of RFID tag and a second frequency corresponding to a second type of RFID tag. The method further includes, in response to the scanning, detecting a response from an RFID tag of the first type or an RFID tag of the second type in the portion of the annulus or an interior of the tubing. The method further includes, based on the detected response, determining one or more characteristics of an environment around the corresponding RFID tag. The one or more characteristics include an intrinsic impedance of a fluid material in the environment around the corresponding RFID tag.

Each of the embodiments, A and B, may have one or more of the following additional elements in any combination. Element 1: wherein the first type of RFID tag uniquely identifies a first type of fluid material disposed in the borehole, and the second type of RFID tag uniquely identifies a second type of fluid material disposed in the borehole. Element 2: wherein determining the one or more characteristics includes: measuring a received power of the detected response; and determining the intrinsic impedance of the fluid material based on the measured received power. Element 3: wherein: the fluid material includes a cement slurry; and determining the one or more characteristics further includes determining, based on the determined intrinsic impedance, a degree to which the cement slurry is cured, a level of fluid influx into the environment during or after cementing, or a condition of a cement produced from the slurry. Element 4: wherein the corresponding RFID tag includes a MEMS sensor. Element 5: wherein the first frequency is within a bandwidth of the first type of RFID tag, and the second frequency is within a bandwidth of the second type of RFID tag. Element 6: wherein the first frequency is equal to a resonant frequency of the first type of RFID tag, and the second frequency is equal to a resonant frequency of the second type of RFID tag. Element 7: wherein the bandwidth of the first type of RFID tag and the bandwidth of the second type of RFID tag are nonoverlapping. Element 8: determining a distance of the corresponding RFID tag relative to a transmitter. Element 9: determining a location of the corresponding RFID tag with respect to locations of a transmitter and a plurality of receivers by employing a triangulation algorithm. Element 10: pumping the fluid material including the corresponding RFID tag to the borehole.

Element 11: wherein the first type of RFID tag uniquely identifies a first type of fluid material disposed in the borehole, and the second type of RFID tag uniquely identifies a second type of fluid material disposed in the borehole. Element 12: wherein the processor determines the one or more characteristics by measuring a received power of the detected response, and determining the intrinsic impedance of the fluid material based on the measured received power. Element 13: wherein: the fluid material includes a cement slurry; and the processor determines the one or more characteristics further by determining, based on the determined intrinsic impedance, a degree to which the cement slurry is cured, a level of fluid influx into the environment during or after cementing, or a condition of a cement produced from the slurry. Element 14: wherein the corresponding RFID tag includes a MEMS sensor. Element 15: the first frequency is within a bandwidth of the first type of RFID tag, and the second frequency is within a bandwidth of the second type of RFID tag, and the bandwidth of the first type of RFID tag and the bandwidth of the second type of RFID tag are nonoverlapping. Element 16: wherein the first frequency is equal to a resonant frequency of the first type of RFID tag, and the second frequency is equal to a resonant frequency of the second type of RFID tag. Element 17: wherein the processor is further configured to determine a distance of the corresponding RFID tag relative to a transmitter. Element 18: wherein the processor is further configured to determine a location of the corresponding RFID tag with respect to locations of the first communication device, a second communication device positioned in the borehole, and a third communication device positioned in the borehole, by employing a triangulation algorithm.

Numerous variations and modifications will become apparent to those skilled in the art once the above disclosure is fully appreciated. The methods and systems can be used for monitoring properties of a fluid (e.g., a sealant) and/or a surrounding environment in a subterranean formation or zone. The ensuing claims are intended to cover such variations where applicable.

What is claimed is:

1. A method of detecting radio frequency identification device (RFID) tags in a borehole, comprising:
    scanning a plurality of frequencies in at least a portion of an annulus surrounding an exterior of a tubing including a casing string in the borehole or an interior of the tubing including the casing string, the plurality of frequencies comprising a first frequency corresponding to a first type of RFID tag and a second frequency corresponding to a second type of RFID tag;
    detecting a response to the scan from an RFID tag of the first type or an RFID tag of the second type in the portion of the annulus or the interior of the tubing; and
    based on the detected response, determining one or more characteristics of an environment around the corresponding RFID tag, the one or more characteristics including an electromagnetic impedance of a fluid material in the environment around the corresponding RFID tag.

2. The method of claim 1, wherein the first type of RFID tag uniquely identifies a first type of fluid material disposed in the borehole, and the second type of RFID tag uniquely identifies a second type of fluid material disposed in the borehole.

3. The method of claim 1, wherein determining the one or more characteristics comprises:
    measuring a received power of the detected response; and
    determining the electromagnetic impedance of the fluid material based on the measured received power.

4. The method of claim 3, wherein:
    the fluid material comprises a cement slurry; and
    determining the one or more characteristics further comprises determining, based on the determined electromagnetic impedance, a degree to which the cement slurry is cured, a level of fluid influx into the environment during or after cementing, or a condition of a cement produced from the slurry.

5. The method of claim 1, wherein the corresponding RFID tag comprises a microelectromechanical (MEMS) sensor.

6. The method of claim 1, wherein the first frequency is within a bandwidth of the first type of RFID tag, and the second frequency is within a bandwidth of the second type of RFID tag.

7. The method of claim 6, wherein the first frequency is equal to a resonant frequency of the first type of RFID tag, and the second frequency is equal to a resonant frequency of the second type of RFID tag.

8. The method of claim 6, wherein the bandwidth of the first type of RFID tag and the bandwidth of the second type of RFID tag are nonoverlapping.

9. The method of claim 1, further comprising determining a distance of the corresponding RFID tag relative to a transmitter.

10. The method of claim 1, further comprising determining a location of the corresponding RFID tag with respect to locations of a transmitter and a plurality of receivers by employing a triangulation algorithm.

11. The method of claim 1, further comprising pumping the fluid material including the corresponding RFID tag to the borehole.

12. A subsurface detection system that comprises:
    a first communication device positioned in a borehole and configured to:
        scan a plurality of frequencies in at least a portion of an annulus surrounding an exterior of a tubing including a casing string in the borehole or an interior of the tubing including the casing string, the plurality of frequencies comprising a first frequency corresponding to a first type of RFID tag and a second frequency corresponding to a second type of RFID tag; and detect a response to the scan from an RFID tag of the first type or an RFID tag of the second type in the portion of the annulus or the interior of the tubing; and a processor configured to:

receive communication of the detected response from the first communication device; and based on the detected response, determine one or more characteristics of an environment around the corresponding RFID tag, the one or more characteristics including an electromagnetic impedance of a fluid material in the environment around the corresponding RFID tag.

13. The system of claim 12, wherein the first type of RFID tag uniquely identifies a first type of fluid material disposed in the borehole, and the second type of RFID tag uniquely identifies a second type of fluid material disposed in the borehole.

14. The system of claim 12, wherein the processor determines the one or more characteristics by measuring a received power of the detected response, and determining the electromagnetic impedance of the fluid material based on the measured received power.

15. The system of claim 14, wherein:

the fluid material comprises a cement slurry; and the processor determines the one or more characteristics further by determining, based on the determined electromagnetic impedance, a degree to which the cement slurry is cured, a level of fluid influx into the environment during or after cementing, or a condition of a cement produced from the slurry.

16. The system of claim 12, wherein the corresponding RFID tag comprises a microelectromechanical (MEMS) sensor.

17. The system of claim 12, wherein:

the first frequency is within a bandwidth of the first type of RFID tag, and the second frequency is within a bandwidth of the second type of RFID tag; and the bandwidth of the first type of RFID tag and the bandwidth of the second type of RFID tag are non-overlapping.

18. The system of claim 17, wherein the first frequency is equal to a resonant frequency of the first type of RFID tag, and the second frequency is equal to a resonant frequency of the second type of RFID tag.

19. The system of claim 12, wherein the processor is further configured to determine a distance of the corresponding RFID tag relative to a transmitter.

20. The system of claim 12, wherein the processor is further configured to determine a location of the corresponding RFID tag with respect to locations of the first communication device, a second communication device positioned in the borehole, and a third communication device positioned in the borehole, by employing a triangulation algorithm.

* * * * *